J. W. WEBB
FILTERING AND COOLING APPARATUS.
No. 193,432. Patented July 24, 1877.
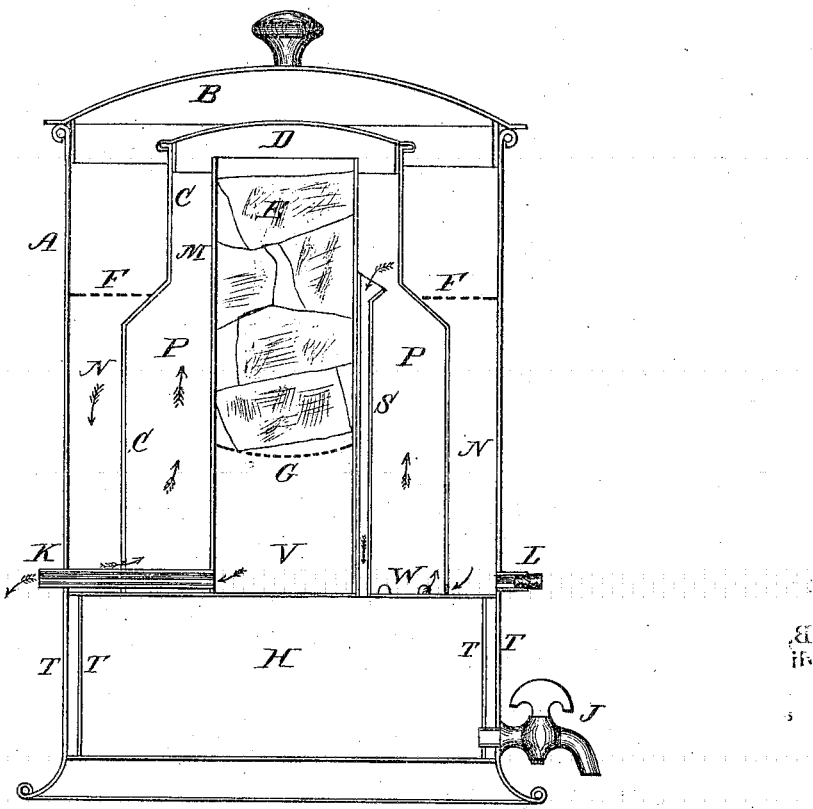

UNITED STATES PATENT OFFICE.

JOSIAH W. WEBB, OF OAKLAND, CALIFORNIA.

IMPROVEMENT IN FILTERING AND COOLING APPARATUS.

Specification forming part of Letters Patent No. 193,432, dated July 24, 1877; application filed June 8, 1877.

*To all whom it may concern:*

Be it known that I, JOSIAH W. WEBB, of Oakland, in the county of Alameda and State of California, have invented certain new and useful Improvements in Filters and Water-Coolers, of which the following is a specification, reference being had to the accompanying drawing.

A represents the outside case of the filter; ., the cover of the same; C, the middle or division wall or case; D, the cover of the same; M, the inner case. The outside case or wall A incloses the chamber N. The intermediate case or wall C incloses the intermediate chamber P, and inside case M incloses inner or ice chamber E. The screen F F (shown by the upper dotted line) is designed to fit the space between the walls A and C, and rest upon the shoulder of the wall C. The dotted line G represents the drip-screen for the ice to rest upon. H represents the reservoir-chamber to receive the supply of filtered water. It has a double or other suitable non-conducting case, T T T T. The discharge faucet is marked J, and is designed to draw off the filtered water for use. K is a tube leading from the drip-chamber to draw off the water that drips from the melting ice. L is the plug to draw the water from the filter-chambers N and P, for the purpose of cleansing and repacking. S represents the tube through which the water passes from the filter-chamber P into the discharge chamber or reservoir H for use. V is the waste-water-chamber.

The following is the operation of the same: The water is poured into the chamber N at the top, and may be supplied regularly or irregularly. The chamber N is packed with charcoal, and the chamber P with marble-dust. The arrows show the direction of the water as it passes through the filter. The ice, being placed in the chamber E, rests upon the screen G, and receives no radiation of heat except from the filter-chamber P, thus utilizing the ice entirely for the cooling of the water. The tube J, being placed in direct contact with the wall of the ice-chamber, gives off its caloric as it passes into the discharge-chamber H. The screen G allows the ice to drip, and prevents the radiation that occurs when the ice lies in water. The lower edge of the case C is perforated to allow the passage of water from the chamber N into the chamber P. The case or wall C is movable, and may be taken out, when necessary, to clean or pack the filter. The case M is fixed, and is never required to be removed. The water, being poured in at the top of the screen F, passes down through the chamber N, and through the perforations W into the chamber P, and up through the same, is thoroughly filtered and purified, and passes down through the tube S into the chamber H, ready to be drawn off at the cock J for use.

I construct these filters of terra-cotta, although they may be made of any other suitable material.

Having thus described my invention, what I claim, and desire to secure by Letters Patent, is—

The screen-bottom chamber E, drip-chamber V, and discharge-tube K, in combination with the chambers P N and tube S, constructed substantially as and for the purpose set forth.

JOSIAH W. WEBB.

Witnesses:
JOHN H. REDSTONE,
ALBERT E. REDSTONE.